(12) United States Patent
Carroll et al.

(10) Patent No.: US 12,412,225 B2
(45) Date of Patent: Sep. 9, 2025

(54) SERIOUS GAMING FOR INTERDEPENDENT CRITICAL INFRASTRUCTURE (CI) RESILIENCE DETERMINATION

(71) Applicants: University College Dublin, Dublin (IE); Nurogames GmbH, Cologne (DE)

(72) Inventors: Páraic James Carroll, Dublin (IE); Daniel Patrick McCrum, Wicklow (IE); Yash Shekhawat, Cologne (DE)

(73) Assignees: University College Dublin, Dublin (IE); Nurogames GmbH, Cologne (DE)

( * ) Notice: Subject to any disclaimer, the term of this patent is extended or adjusted under 35 U.S.C. 154(b) by 799 days.

(21) Appl. No.: 17/736,943

(22) Filed: May 4, 2022

(65) Prior Publication Data
US 2023/0360162 A1 Nov. 9, 2023

(51) Int. Cl.
*G06Q 50/26* (2024.01)

(52) U.S. Cl.
CPC .................. *G06Q 50/265* (2013.01)

(58) Field of Classification Search
CPC ...... G06Q 50/265; G06Q 10/04; G06Q 50/06; A63F 13/57; A63F 13/822; A63F 13/35
See application file for complete search history.

(56) References Cited

U.S. PATENT DOCUMENTS

2015/0019267 A1\* 1/2015 Prieto .................. G06Q 10/067
705/348

\* cited by examiner

*Primary Examiner* — Jeffrey S Vanderveen
(74) *Attorney, Agent, or Firm* — CRGO Global; Steven M. Greenberg

(57) ABSTRACT

Serious gaming for interrelated critical infrastructure (CI) resilience improvement includes receiving from a serious gaming participant a selection of an anomalous event for a geographic region for which a hierarchy of CI elements has been modeled, and a specified change in allocation of at least one resource in a corresponding one of the CI elements. A previously determined cascading impact upon the CI elements resulting from the anomalous event is then retrieved and compared to a hypothetical cascading impact produced by a simulation of the model with the specified change. A visualization of the comparison is transmitted to the serious gaming participant so as to show the result of the hypothetical change in resources upon the cascading impact of the event in the hierarchy of CI elements.

15 Claims, 3 Drawing Sheets

SERIOUS GAMING FOR INTERDEPENDENT CRITICAL INFRASTRUCTURE (CI) RESILIENCE DETERMINATION

BACKGROUND OF THE INVENTION

Field of the Invention

The present invention relates to the technical field of infrastructure modeling and more particularly to the modeling of an impact of an adverse event upon a hierarchy of interdependent critical infrastructure nodes.

Description of the Related Art

Critical infrastructure (CI) refers to those community structural devices delivering critical services to a community. Examples include elements of the public water supply and distribution network, elements of the cellular telephonic communications network, elements of the electric power distribution network, elements of the natural gas distribution network, roadways, waterways, airports, railways, bridges and tunnels and so forth. In the modern era, much of the operability and tunability of CI elements in a community depend upon the proper and secure functioning of computing devices sensing the state of affairs in the respective CI elements and commanding the operation of electromechanical control elements in response to the sensed state of affairs. Thus, the failure of a computational controller for a given CI element often will result in the failure of the given CI element itself.

In the case of an ordinary control system controlling a single structural element, such as a machine in a factory, one must monitor the operation of the control system and the operation of the machine only, since the failure only impacts the operation of the machine. However, in many instances, different controlled machines depend upon other controlled machines such that the failure of one machine can cascade in impact upon other machines within a hierarchy of machines. Yet, in the circumstance of an interdependent hierarchy of machines in a factory, an overlord process can monitor the entirety of the hierarchy and the corresponding controllers in order to appreciate the impact of an exception in one of the machines upon interdependent others of the machines.

In the case of interdependent CI elements in a community, so much is not the case. To wit, in a typical geographically definable community, different CI elements not only may be geographically disbursed about a large area-much larger than any ordinary factory, but the geographically disbursed CI elements may be managed by different individuals or teams of individuals and in some cases, by different teams of individuals not adapted to share in real time the health of any given CI element and its corresponding controller. Further, as is most often the case, different CI elements in the community often relate to completely different organizations providing completely different services to the community, such as wastewater management, telecommunications and power distribution.

The problem of heterogeneous CI elements supporting the delivery of heterogeneous services to a community affects the manner in which community managers prepare for and respond to adverse events. In the instance of a single service provider in the community for a single community service, one can model the operation of corresponding CI elements in support of the delivery of the single community service and the behavior of those CI elements in the face of an adverse event. However, in so far as different service providers in a community lack data sharing and connectivity, no modeling heretofore has been possible as to the impact of a fault condition in one CI element of one service provider providing one service to the community, upon one or more CI elements of other service providers for the community providing other services to the community—the so-called cascading impact of an anomalous condition.

Further compounding the difficulties in the modeling of the cascading impact of an anomalous condition, simulating various anomalous events in a model and analyzing the outcome of the simulations so as to optimize resource allocations can be labor intensive. However, to truly achieve resource allocation optimization, a large number of simulations must be conducted and results analyzed. Most organizations lack the human resources to achieve the requisite simulations.

As well, the resilience of any given one of the CI elements in the hierarchy can vary according to a tolerance for change and a particular allocation of resources to the given one of the CI elements, such as additional battery backup power, additional communications bandwidth, additional pumping mechanisms, and the like. Given the vastness of possibilities of resource allocations and the number of prospective anomalous events occurring in respect to one or more CI elements, optimizing a hierarchy of interdependent CI elements for resource allocation to promote an optimal degree of resilience is simply too great a task to date for the limited personnel available to study each possible simulation.

BRIEF SUMMARY OF THE INVENTION

Embodiments of the present invention address technical deficiencies of the art in respect to the optimization of the resilience of interdependent CI elements in a hierarchy to minimize the cascading impact of an anomalous event. To that end, embodiments of the present invention provide for a novel and non-obvious method for serious gaming for interrelated CI resilience improvement. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a serious gaming method for interrelated CI resilience improvement includes the generation of a CI hierarchical model in memory of a computing platform, the CI hierarchical model modeling an interdependent hierarchy of CI elements of a geographic region. Multiple different serious gaming participants are then authenticated for access to the CI hierarchical model from different computing devices over a data communications network. Thereafter, from one of the serious gaming participants, a selection of an anomalous event for the geographic region and a specified change in allocation of at least one resource in a corresponding one of the CI elements can be received from over the data communications network into the computing platform.

In response to the specification of the change in allocation of one or more resources in the corresponding ones of the CI elements, a previously determined cascading impact upon the multiplicity of CI elements is retrieved from the memory in the computing platform resulting from the anomalous event. As well, a simulation executes in the computing platform of an impact of the anomalous event upon the CI hierarchical model including the specified change in allocation, and a hypothetical cascading impact computed in the memory from the simulation. Finally, a visualization of a comparison of the hypothetical cascading impact with the determined cascading impact is transmitted over the data communications network to a corresponding one of the computing devices of the one of the serious gaming participants.

In one aspect of the embodiment, other specified changes in the allocation of the resource are received from over the data communications network into the computing platform from other gaming participants. Further, additional simulations may be executed in the CI hierarchical model for each of the other gaming participants. To that end, each of the additional simulations simulates a corresponding impact of the anomalous event upon the CI hierarchical model including a respective one of the other specified changes in allocation. Even further, an additional hypothetical cascading impact is computed for each of the additional simulations. Finally, an associated visualization can be transmitted to each one of the computing devices for corresponding ones of the other gaming participants, of a comparison of each of the additional hypothetical cascading impacts with the determined cascading impact.

With respect to the specified change in allocation, optionally, the specified change in allocation is an additional power source modeled at a node of the CI hierarchical model corresponding to a particular one of the CI elements. As another option, the specified change in allocation is additional network bandwidth modeled at a node of the CI hierarchical model corresponding to a particular one of the CI elements. Finally, as yet another option, each of the CI elements can be modeled with a corresponding node in the CI hierarchical model, and each corresponding node can be assigned a resilience value as a function of allocated resources to the corresponding node, the resilience value limiting an impact of a state change sensed in an adjacent node in the CI hierarchical model so as to limit the hypothetical cascading impact from the simulation.

In another embodiment of the invention, a data processing system is adapted for serious gaming for interrelated CI resilience improvement. The system includes a host computing platform including one or more computers, each with memory and one or processing units including one or more processing cores. The system further includes a serious gaming module. The module includes computer program instructions enabled while executing in the memory of at least one of the processing units of the host computing platform to generate a CI hierarchical model in memory of a computing platform modeling an interdependent hierarchy of CI elements of a geographic region, to. authenticate different serious gaming participants to access the CI hierarchical model from different computing devices over a data communications network and to receive from over the data communications network into the computing platform from one of the serious gaming participants, a selection of an anomalous event for the geographic region and a specified change in allocation of at least one resource in a corresponding one of the CI elements.

The program instructions additionally are enabled to retrieve from the memory in the computing platform a previously determined cascading impact upon a multiplicity of the CI elements resulting from the anomalous event, and to execute in the computing platform a simulation of an impact of the anomalous event upon the CI hierarchical model including the specified change in allocation. Thereafter, the program instructions compute in the memory a hypothetical cascading impact from the simulation. Finally, the program instructions transmit over the data communications network to a corresponding one of the computing devices of the one of the serious gaming participants a visualization of a comparison of the hypothetical cascading impact with the determined cascading impact.

In this way, different resource allocations and resulting simulations of a hierarchical CI model in response to different specified anomalous events occurring with respect to particular CI elements can be sourced from outside of the centralized organization of each CI element without limitation of the personnel constraints of each CI element. Only those of the simulated allocations shown to positively impact the resilience of the CI model through a reduction in the cascading impact of the specified anomalous event are surfaced for further consideration. As well, the result of a hypothetical change in resources upon the cascading impact of the event in the hierarchy of CI elements can be readily visualized even though the hypothetical change is provided in a crowdsourced manner outside the centralized control of the CI hierarchical model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for serious gaming for interrelated CI resilience improvement. In accordance with an embodiment of the invention, different gaming participants configure different nodes of a hierarchical CI model of interdependent CI elements with different resource allocations, such as access to power, communications, or personnel resources. The different gaming participants further select an anomalous event for occurrence in respect to one or more of the CI elements, such as weather, power loss, flooding, traffic, accident, fire, etc. For each anomalous event, the cascading impact is computed in the model in light of the different corresponding resource allocations, and the computed cascading impact is compared to a previously determined cascading impact of the anomalous event according to prior set of resource allocations. To the extent that one of the computed cascading impacts is less extensive than that of a corresponding previously determined cascading impact, a visualization of the comparison is transmitted to the associated one of the gaming participants.

Figure 1:
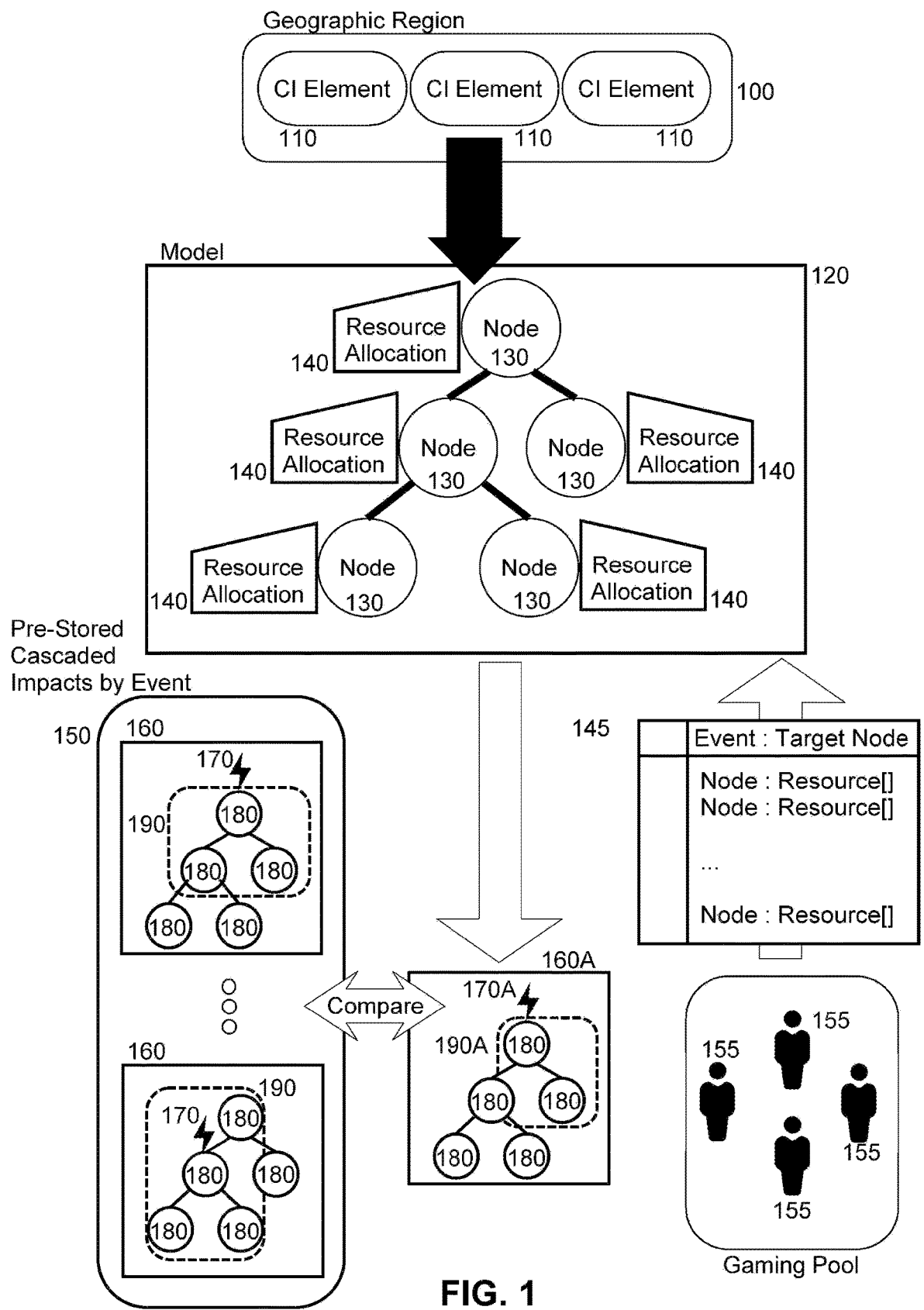
FIG. 1 is a pictorial illustration reflecting different aspects of a process of serious gaming for interrelated CI resilience improvement.

In illustration of one aspect of the embodiment, FIG. 1 pictorially shows a process of serious gaming for interrelated CI resilience improvement. As shown in FIG. 1, different CI elements 110 within a geographic region 100 are modeled within a hierarchical model 120 interdependent nodes 130. Within the model 120, each of the nodes 130 corresponding to one of the CI elements 110 is accorded a particular resource allocation 140, such as a number of battery backup generators, a particular amount of communications bandwidth, a particular number of personnel, a particular number of pumps, or a particular number of entrances, exits, or lanes in the context of a roadway or tunnel, to name a few examples. It is to be recognized that each of the nodes 130 in the model 120 can be assigned multiple different resource allocations 140 for multiple different resources.

A set 150 of pre-stored cascaded impacts 160 includes a specification of an extent of a cascading impact 190 for a particular anomalous event 170 imparted upon a particular one of the nodes 180 of the model 120 having a particular selection of resource allocations 140 accorded to respectively different ones of the nodes 180. The set 150 includes a query interface (not shown) such that the set 150 can return one of the different pre-stored cascaded impacts 160 corresponding to a query-specified anomalous event and a specific one of the nodes 130. To that end, different gaming participants 155 each submit a template 145 of specific values for the resource allocations 140 for corresponding ones of the different nodes 130 and direct the simulation of the model 120 in response to a specified anomalous event 170A and a target one of the nodes 180.

The extent of the cascading impact 190A resulting from the simulation is then compared to a corresponding extent of the cascading impact 190 for the one of the pre-stored cascaded impacts 160 in the set 150 sharing the same anomalous event 170A. A visualization of the difference between both extents of the cascading impact 190, 190A can be transmitted to a computing device of a corresponding one of the gaming participants 155. As well, to the extent that the extent of the cascading impact 190A includes fewer ones of the nodes 180 than the extent of the cascading impact 190 in the one of the pre-stored cascaded impacts 160 in the set 150, the specific values for the resource allocations 140 in the submitted template 145 can be presented as the preferred resource allocation in order to optimize the resilience of the different CI elements 110 within the geographic region 100.

Of note, the production of different simulations of the model 120 by the different gaming participants 155 can be gamified such that, through the spirit of competition, each of the gaming participants 155 is encouraged to submit many different potential instances of the template 145 proposing different variations of the resource allocations 140 for corresponding ones of the nodes 130 so as to enhance the resilience of the different nodes 130 in the face of different specified anomalous events. A leaderboard of those of the gaming participants able to produce the largest reduction in a corresponding cascading impact 190 from the pre-stored cascaded impacts 160 in the set 150 can be maintained and transmitted periodically to the computing device of each of the gaming participants 155.

Figure 2:
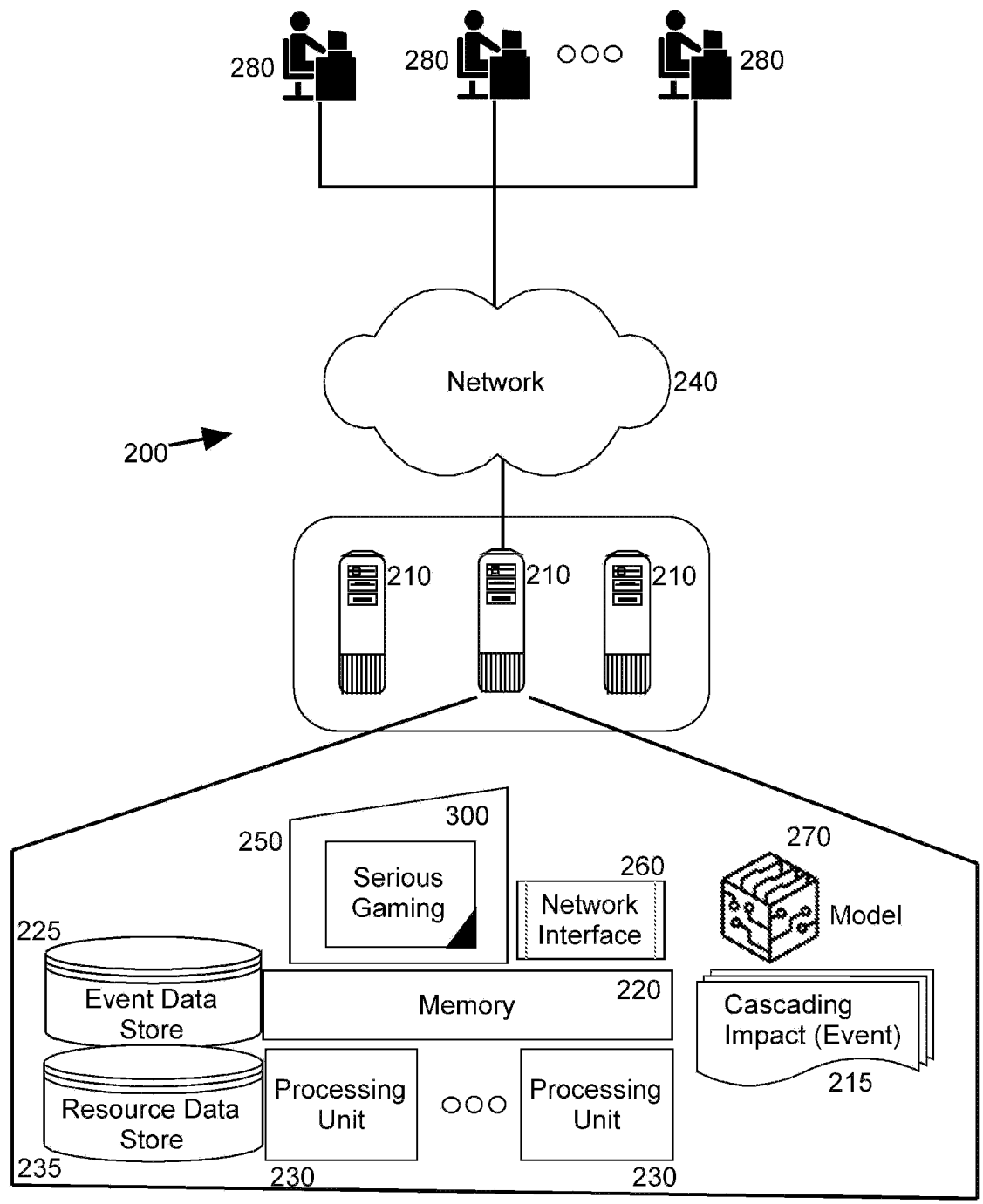
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system and optionally as a data mining framework. In further illustration, FIG. 2 schematically shows a data processing system adapted to perform serious gaming for interrelated CI resilience improvement. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

A model 270 of a hierarchy of CI elements is maintained in the memory 220 of the host computing platform along with a set 215 of different pre-stored cascaded impacts, each corresponding to a particular anomalous event targeting a particular node in the model 270. As well, an event data store 225 of different anomalous events is coupled to the memory 220 and the one or more processing units 230 along with a resource data store 235 of different resources able to be allocated to different ones of the CI elements modeled as corresponding nodes within the model 270. A query interface (not shown) is provided for each of the event data store 225, resource data store 235 and set 215 of pre-stored cascaded impacts so that a particular one of the pre-stored cascaded impacts can be retrieved in reference to a corresponding anomalous event, so that a listing of available anomalous events for simulation can be retrieved, and so that a listing of available resources able to be allocated to a particular type of CI element can be retrieved.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for serious gaming for interrelated CI resilience improvement. Specifically, the program instructions during execution receive from a computing device 280 of a corresponding gaming participant from over the data communications network 240, a templated resource allocation of resources in the resource data store 235 for the model 270 along with a specified anomalous event in the event data store 225.

In response to the receipt of the templated resource allocation and the specified anomalous event, the program instructions execute a simulation of the model 270 so as to compute a cascading impact upon the hierarchy of CI elements in response to the specified anomalous event in light of the resource allocations of the template. Specifically, the program instructions submit to the target node in the model 270 the anomalous event and the target node programmatically manages any changes its state as a function of a portion of the resource allocations attributed to the target node such that greater allocations of a resource in the target node (or any other node) result in a greater likelihood that no state change occurs in response to an anomalous event or a state change in an adjacent one of the nodes.

The program instructions further communicate the state change from the target node to dependent other nodes of the model 270 (if any), each of the dependent other nodes including a corresponding event handler programmed to managing respective changes also as a function of a portion of the resource allocations for each one of the respective nodes. The state change may be communicated as an event for processing in the event handler. Like the target node, the resilience (or resistivity to state change) in any of the dependent nodes is set forth as a function of resource allocation so that a greater resource allocation to a dependent node renders the node less likely to experience a state change in an event handler processing an event received from an adjacent node upon which the dependent node is dependent.

Optionally, the program instructions write the result of the management of state change in each of the dependent nodes of the model 270 to a log. The process continues each one of the nodes that are dependent from those dependent other nodes until such a time that no state changes programmatically occur in the dependent nodes. A resultant collection of nodes in the model 270 for which changes have occurred, which may be evident from a parsing and processing of the log, is the extent of the cascading impact of the anomalous event in light of the resources allocated to the nodes of the model 270 in the template. The program instructions then query the set 215 of cascaded impacts according to the anomalous event in order to retrieve one or more of the pre-stored cascaded impacts in the set 215.

The extent of cascading impact resulting from the simulation is then compared to those of the retrieved pre-stored cascaded impacts in the set 215 so as to determine if the cascading impact of the simulation reflects a reduction in a number of the nodes in the model 270 relative to the cascading impact of the pre-stored cascaded impacts of the set 215. The program instructions may transmit a visualization of the comparison to the computing device 280 of the gaming participant. On the condition that the extent of the cascading impact resulting from the simulation reflects a reduction in the cascaded effect of the anomalous event, the resource allocations of the template may be persisted in the memory 220 of the host computing platform as an optimal resource allocation configuration for the model 270.

Figure 3:
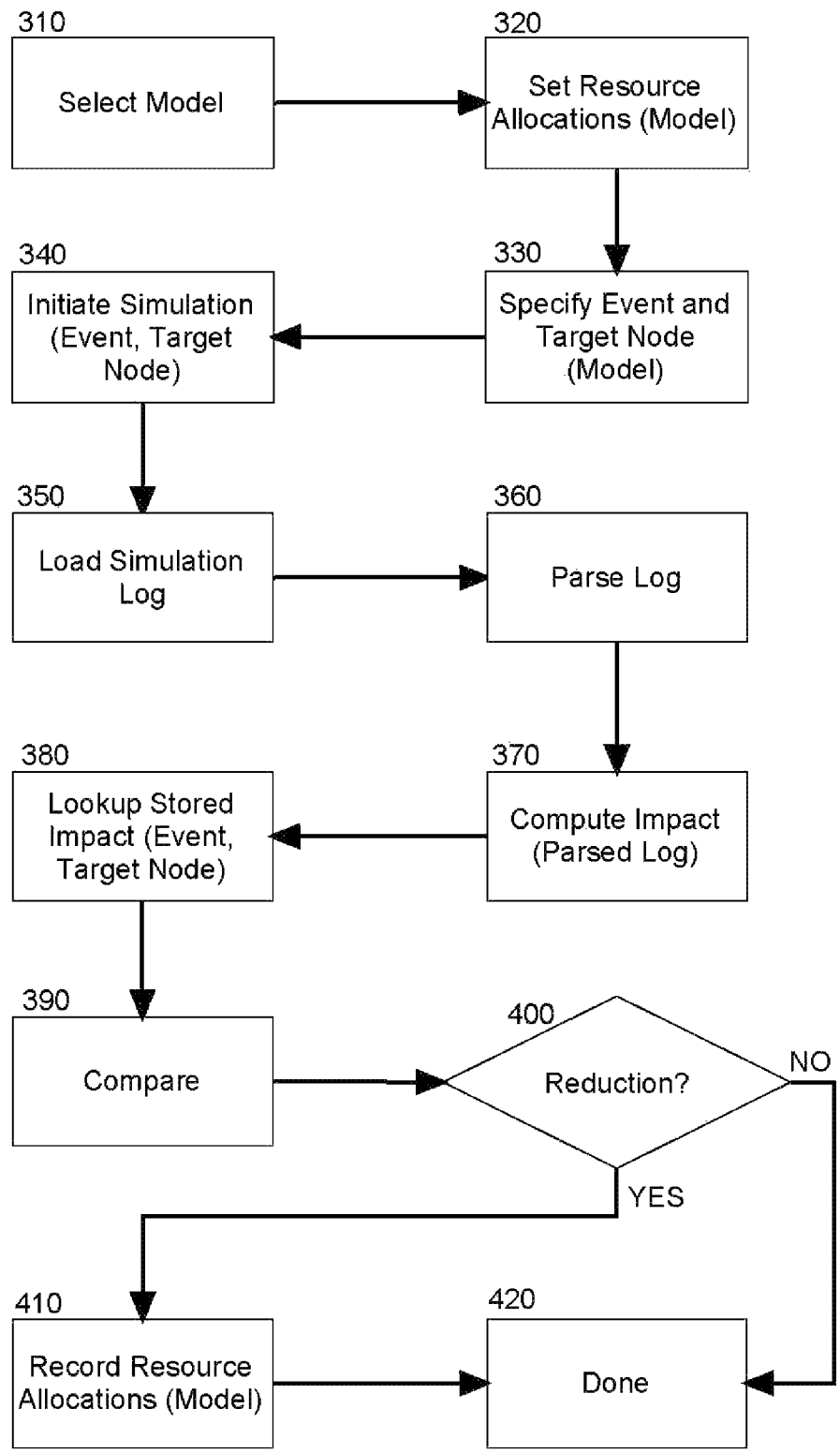

In further illustration of an exemplary operation of the module, FIG. 3 is a flow chart illustrating one of the aspects of the process of FIG. 1. Beginning in block 310, a model for an interdependent CI hierarchy is selected for simulation and in block 320, a set of allocable resources are defined for the different nodes of the model, each corresponding to a different CI element in a defined geographic area. In block 330, an anomalous event is selected for simulation and a target node in the model specified for the anomalous event. Then, in block 340, the model simulates the cascaded impact of the anomalous event upon the target node in light of the defined allocation of resources to the different nodes of the model.

In block 350, a simulation log for the simulation is loaded, the log including entries indicating the processing of each event in each node of the model and the resulting state change, if any, including an allocation of resources to the node. In block 360 the log is parsed and in block 370, an extent of cascading impact is determined from then parsed entries of the log. Concurrently, in block 380 a pre-stored impact for the anomalous event is retrieved from a set of pre-stored impacts. Thereafter, in block 390, an extent of cascading impact from the retrieved pre-stored impact is compared to the extent of cascading impact of the simulation in order to determine if the cascading impact of the simulation reflects a reduction in the extent of cascading impact for the anomalous event resulting from the defined set of allocable resources for the nodes of model.

In decision block 400, if a reduction in the extent of the cascading impact for the anomalous event is determined, a record is recorded with respect to the allocations in block 410. The process then ends in block 420.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A serious gaming method for interrelated critical infrastructure (CI) resilience improvement comprising:
    generating a CI hierarchical model in memory of a computing platform modeling an interdependent hierarchy of CI elements of a geographic region;
    authenticating a multiplicity of different serious gaming participants to access the CI hierarchical model from different computing devices over a data communications network;
    receiving from over the data communications network into the computing platform from one of the serious gaming participants, a selection of an anomalous event for the geographic region and a specified change in allocation of at least one resource in a corresponding one of the CI elements;
    retrieving from the memory in the computing platform a previously determined cascading impact upon a multiplicity of the CI elements resulting from the anomalous event;
    executing in the computing platform a simulation of an impact of the anomalous event upon the CI hierarchical model including the specified change in allocation;
    computing in the memory a hypothetical cascading impact from the simulation; and,
    transmitting over the data communications network to a corresponding one of the computing devices of the one of the serious gaming participants a visualization of a comparison of the hypothetical cascading impact with the determined cascading impact.

2. The method of claim 1, further comprising:
    receiving over the data communications network in the computing platform from others of the gaming participants, other specified changes in the allocation of at least one resource in a corresponding one of the CI elements;
    executing additional simulations for each of the others of the gaming participants, each of the additional simulations simulating a corresponding impact of the anomalous event upon the CI hierarchical model including a respective one of the other specified changes in allocation;
    computing an additional hypothetical cascading impact for each of the additional simulations; and,
    transmitting to each one of the computing devices for corresponding ones of the others of the gaming participants, an associated visualization of a comparison of each of the additional hypothetical cascading impacts with the determined cascading impact.

3. The method of claim 1, wherein the specified change in allocation is an additional power source modeled at a node of the CI hierarchical model corresponding to a particular one of the CI elements.

4. The method of claim 1, wherein the specified change in allocation is additional network bandwidth modeled at a node of the CI hierarchical model corresponding to a particular one of the CI elements.

5. The method of claim 1, wherein each of the CI elements is modeled with a corresponding node in the CI hierarchical model, and each said corresponding node is assigned a resilience value as a function of allocated resources to the corresponding node, the resilience value limiting an impact of a state change sensed in an adjacent node in the CI hierarchical model so as to limit the hypothetical cascading impact from the simulation.

6. A data processing system adapted for serious gaming for interrelated critical infrastructure (CI) resilience improvement, the system comprising:
    a host computing platform comprising one or more computers, each with memory and one or processing units including one or more processing cores; and,
    a serious gaming module comprising computer program instructions enabled while executing in the memory of at least one of the processing units of the host computing platform to perform:
        generating a CI hierarchical model in memory of a computing platform modeling an interdependent hierarchy of CI elements of a geographic region;
        authenticating a multiplicity of different serious gaming participants to access the CI hierarchical model from different computing devices over a data communications network;
        receiving from over the data communications network into the computing platform from one of the serious gaming participants, a selection of an anomalous event for the geographic region and a specified change in allocation of at least one resource in a corresponding one of the CI elements;
        retrieving from the memory in the computing platform a previously determined cascading impact upon a multiplicity of the CI elements resulting from the anomalous event;
        executing in the computing platform a simulation of an impact of the anomalous event upon the CI hierarchical model including the specified change in allocation;
        computing in the memory a hypothetical cascading impact from the simulation; and,
        transmitting over the data communications network to a corresponding one of the computing devices of the one of the serious gaming participants a visualization of a comparison of the hypothetical cascading impact with the determined cascading impact.

7. The system of claim 6, wherein the program instructions are further enabled to perform:

receiving over the data communications network in the computing platform from others of the gaming participants, other specified changes in the allocation of at least one resource in a corresponding one of the CI elements;

executing additional simulations for each of the others of the gaming participants, each of the additional simulations simulating a corresponding impact of the anomalous event upon the CI hierarchical model including a respective one of the other specified changes in allocation;

computing an additional hypothetical cascading impact for each of the additional simulations; and, transmitting to each one of the computing devices for corresponding ones of the others of the gaming participants, an associated visualization of a comparison of each of the additional hypothetical cascading impacts with the determined cascading impact.

8. The system of claim 6, wherein the specified change in allocation is an additional power source modeled at a node of the CI hierarchical model corresponding to a particular one of the CI elements.

9. The system of claim 6, wherein the specified change in allocation is additional network bandwidth modeled at a node of the CI hierarchical model corresponding to a particular one of the CI elements.

10. The system of claim 6, wherein each of the CI elements is modeled with a corresponding node in the CI hierarchical model, and each said corresponding node is assigned a resilience value as a function of allocated resources to the corresponding node, the resilience value limiting an impact of a state change sensed in an adjacent node in the CI hierarchical model so as to limit the hypothetical cascading impact from the simulation.

11. A computing device comprising a non-transitory computer readable storage medium having program instructions stored therein, the instructions being executable by at least one processing core of a processing unit to cause the processing unit to perform a method for serious gaming for interrelated critical infrastructure (CI) resilience improvement, the method including:

generating a CI hierarchical model in memory of a computing platform modeling an interdependent hierarchy of CI elements of a geographic region;

authenticating a multiplicity of different serious gaming participants to access the CI hierarchical model from different computing devices over a data communications network;

receiving from over the data communications network into the computing platform from one of the serious gaming participants, a selection of an anomalous event for the geographic region and a specified change in allocation of at least one resource in a corresponding one of the CI elements;

retrieving from the memory in the computing platform a previously determined cascading impact upon a multiplicity of the CI elements resulting from the anomalous event;

executing in the computing platform a simulation of an impact of the anomalous event upon the CI hierarchical model including the specified change in allocation;

computing in the memory a hypothetical cascading impact from the simulation; and, transmitting over the data communications network to a corresponding one of the computing devices of the one of the serious gaming participants a visualization of a comparison of the hypothetical cascading impact with the determined cascading impact.

12. The device of claim 11, wherein the method further comprises:

receiving over the data communications network in the computing platform from others of the gaming participants, other specified changes in the allocation of at least one resource in a corresponding one of the CI elements;

executing additional simulations for each of the others of the gaming participants, each of the additional simulations simulating a corresponding impact of the anomalous event upon the CI hierarchical model including a respective one of the other specified changes in allocation;

computing an additional hypothetical cascading impact for each of the additional simulations; and, transmitting to each one of the computing devices for corresponding ones of the others of the gaming participants, an associated visualization of a comparison of each of the additional hypothetical cascading impacts with the determined cascading impact.

13. The device of claim 11, wherein the specified change in allocation is an additional power source modeled at a node of the CI hierarchical model corresponding to a particular one of the CI elements.

14. The device of claim 11, wherein the specified change in allocation is additional network bandwidth modeled at a node of the CI hierarchical model corresponding to a particular one of the CI elements.

15. The device of claim 11, wherein each of the CI elements is modeled with a corresponding node in the CI hierarchical model, and each said corresponding node is assigned a resilience value as a function of allocated resources to the corresponding node, the resilience value limiting an impact of a state change sensed in an adjacent node in the CI hierarchical model so as to limit the hypothetical cascading impact from the simulation.

* * * * *